United States Patent [19]

Griffith

[11] 4,095,559
[45] Jun. 20, 1978

[54] VENTILATED LITTER BOX

[76] Inventor: Loren B. Griffith, 250 Washington Ave., Phoenixville, Pa. 19460

[21] Appl. No.: 736,038

[22] Filed: Oct. 27, 1976

[51] Int. Cl.² ............................................. A01K 29/00
[52] U.S. Cl. ........................................................ 119/1
[58] Field of Search .................. 119/1, 19; 4/112, 213

[56] References Cited

U.S. PATENT DOCUMENTS

| | | | |
|---|---|---|---|
| 2,300,109 | 10/1942 | Dahlke | 4/112 |
| 2,990,557 | 7/1961 | Wetherell | 4/213 |
| 3,246,630 | 4/1966 | Dearing et al. | 119/1 |
| 3,428,026 | 2/1969 | Sohmers et al. | 119/19 |
| 3,455,277 | 7/1969 | Edwards | 119/1 |
| 3,486,173 | 12/1969 | Youngblood | 4/112 |
| 3,487,814 | 1/1970 | Ingebritsen | 119/19 |
| 3,793,989 | 2/1974 | Clark | 119/19 |
| 3,885,523 | 5/1975 | Coleman | 119/1 |

*Primary Examiner*—Richard J. Johnson
*Attorney, Agent, or Firm*—Charles A. McClure

[57] ABSTRACT

A litter box for pet animals is provided with a ventilating enclosure. When connected to means for exhausting air therefrom, the box and the litter in it are ventilated by flow of air therefrom into the enclosure, from which it is exhausted elsewhere. The enclosure is formed by the floor and sidewalls of the box, a partial cover, and a foraminous barrier between the cover and the floor, preferably formed as a skirt on the cover.

6 Claims, 5 Drawing Figures

VENTILATED LITTER BOX

This invention relates to ventilating animal litter boxes of the type to which a pet is enable to have free access.

Keeping pet animals inside is facilitated by providing litter boxes to which the pets may have free access. Such conventional litter boxes tend to become unpleasantly odoriferous even with frequent replacement of the litter and may become a health hazard in the event of less frequent replacement.

Ventilation of animal cages is not unknown and is well nigh essential in close quarters. However, arrangements suitable for large, multiple or permanent cages are not suited to use with relatively small, individual, or portable litter boxes.

A primary object of the present invention is provision of ventilation for a litter box for pet animals or the like.

Another object of this invention is adaptation of an otherwise conventional litter box for ventilation.

A further object of the invention is provision of a partially covered litter box.

Other objects of the present invention, together with means and methods for attaining the various objects, will be apparent from the following description and the accompanying diagrams of a preferred embodiment, which is presented by way of example rather than limitation.

In general, the objects of the present invention are accomplished, in a ventilating litter box for a pet animal or the like, by means of a base comprising an enclosed region and a non-enclosed region, the non-enclosed region being adapted to receive litter and to be occupied by the pet animal at will, the respective regions being delineated by a foraminous barrier, the enclosed region having a vent therein to the exterior.

More particularly, this invention includes in such a litter box having a generally rectangular base portion and upstanding sidewalls extending along three sides thereof, by a ventilating cover fitting onto the top edges of three sides thereof and extending partially over the base, a skirt extending downward from the cover into proximity with the base and extending laterally into contiguity with the wall portion to form an enclosure, the skirt being foraminous, and the enclosure having a vent opening to the exterior.

Figure 1:
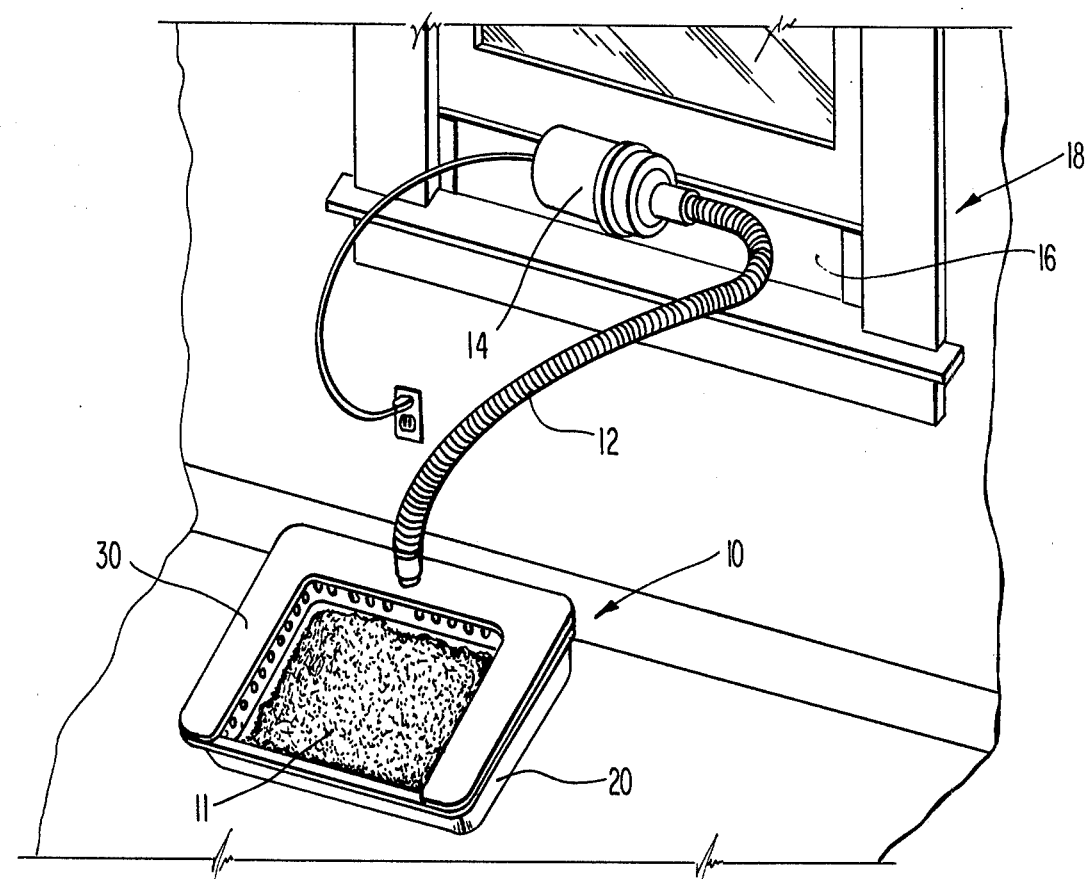
FIG. 1 is a perspective view of a ventilated litter box assembly according to this invention.

FIG. 1 shows in perspective litter box assembly 10 connected by flexible hose 12 to exhaust fan 14 mounted on baffle plate 16 in window frame 18. Traylike base 20 contains finely divided litter 11. The base and partial cover 30 of the litter box appear in more detail in subsequent views.

Figure 3:
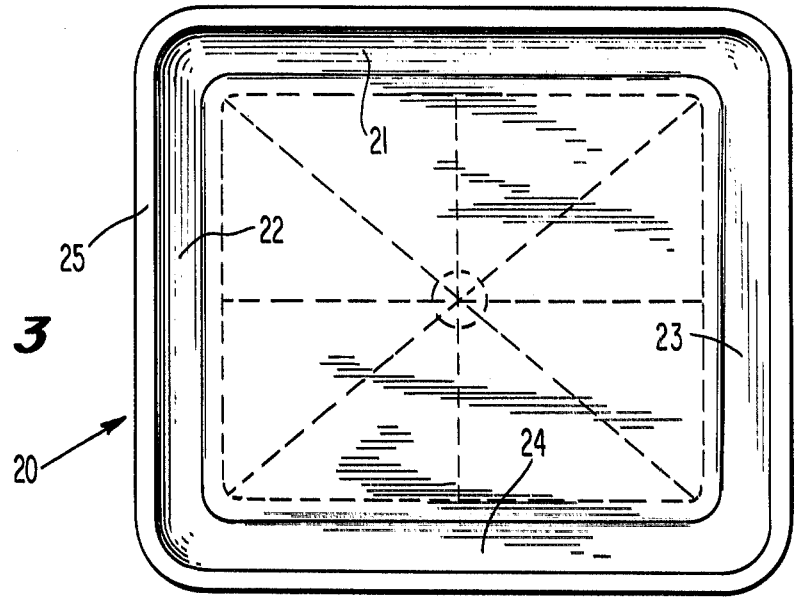
FIG. 3 is a plan of the litter box base shown in FIG. 2.
Figure 2:
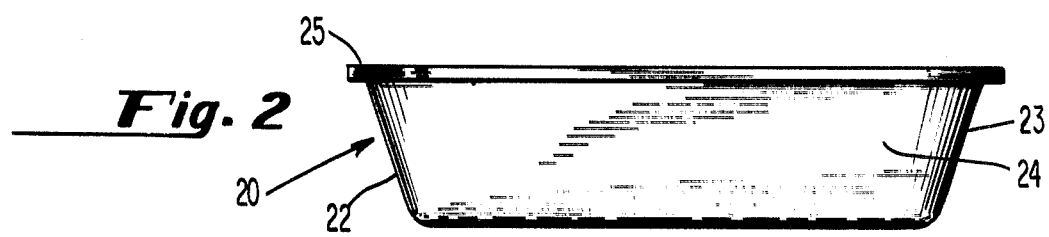
FIG. 2 is a front elevation of the traylike base of the litter box shown in the preceding view.

FIGS. 2 and 3 show in front elevation and plan, respectively, base 20 in the form of a generally rectangular tray with upwardly and outwardly sloping sidewalls 21 at the rear, 22 and 23 at the sides, and 24 at the front, with narrow flange 25 at the top. As shown, the bottom has underlying reinforcing ribs (shown in broken lines) radiating from the center and around the periphery.

Figure 4:
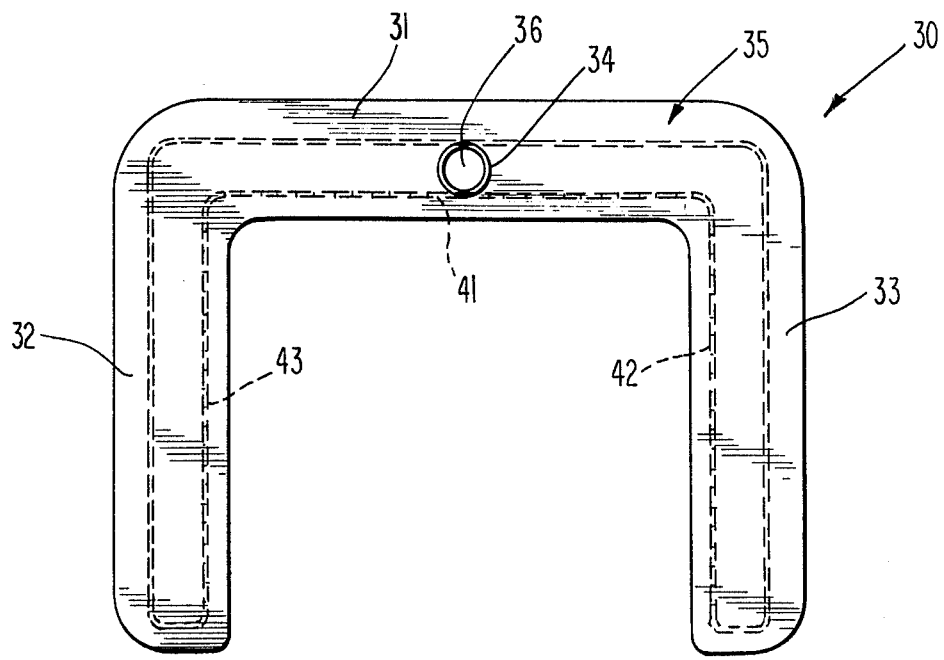
FIG. 4 is a plan of a partial cover for the traylike base of FIGS. 2 and 3.
Figure 5:
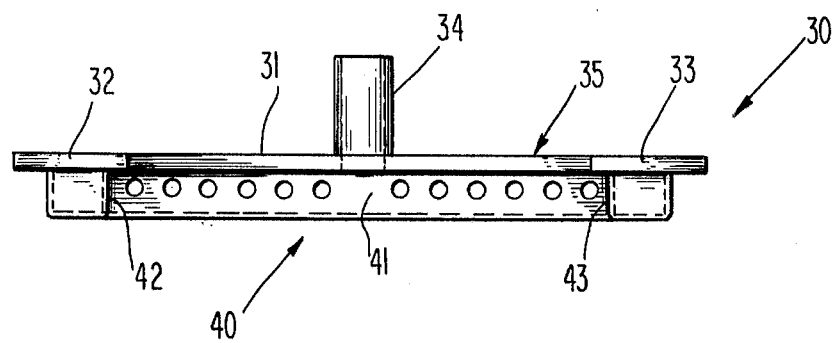
FIG. 5 is a front elevation of the cover of FIG. 4.

FIGS. 4 and 5 show partial cover 30 in front elevation and plan, respectively. The cover comprises U-shaped horizontal plate 35 adapted to fit along its body portion 31 onto the top edge of rear wall 21 of the body and to fit along its arm portions 32 and 33 onto the top edges of flanking side walls 22 and 23. The body portion has cylindrical flange 34 upstanding therefrom defining exhaust vent 36 therein. Skirt 40 depending from plate 35 has rear portion 41 and flanking side portions 42 and 43 extending downward a distance approaching the depth of base 20 and is thereby adapted to come into proximity with the inside bottom surface of the base when the cover is assembled thereonto, as well as to the sidewalls of the base so as to form an enclosure within the general outline of the litter box. The skirt is foraminous, i.e., supplied with numerous openings therethrough, to provide ventilating communication between the enclosure and the open interior of the box.

Operation of the apparatus of this invention is readily understood. The electrically operated fan withdraws air from the enclosure and exhausts it to the exterior (in this instance, outside the window). Air is drawn over and through the litter in the open interior of the box and into the enclosure from which it then is exhausted. The fan action may be continuous, may be intermittent at intervals determined by a conventional timing mechanism or by a device (e.g., pressure-actuated, or moisture-actuated) indicative of a pet's presence or activity in the litter box, or may be switched manually.

In consequence of such operation, noxious odors from the litter box are exhausted, and the resulting ventilation is conducive to increased useful life of the litter itself. The litter box assembly is readily portable in either assembled or disassembled form, and assembly or disassembly (as for cleaning, storage, etc.) requires only a couple minutes.

No special materials of construction are required, and synthetic polymeric materials such as polyethylene or polypropylene are suitably inert and easy to clean. Both the base and the cover can be made conveniently by blow molding. If desired, the skirt can be formed apart form the plate of the cover and be assembled thereto subsequently as an alternative to integral formation.

Although a preferred embodiment of this invention has been illustrated and described, some modification has been suggested above. Other modification may be made therein, as by addition, combination, or subdivision of parts or by substitution of equivalents, while retaining advantages and benefits of the invention, which itself is defined in the following claims.

The claimed invention is:

1. Ventilated litter box for pet animals, comprising in combination a traylike open-top portable container having an upwardly extending wall terminating in a top edge, a partial cover therefor adapted to fit onto part of the top edge and to extend part of the way over the container, a skirt extending from the cover downward a distance approaching the depth of the container and extending laterally to the container wall to form an enclosure therewith, the skirt having ventilating openings therein, and the enclosure having an exhaust vent therein for connection to means for exhausting air from the enclosure and thereby drawing air through the litter box and the litter therein.

2. Ventilated litter box according to claim 1, wherein the traylike container is rectangular in plan and the cover fits onto and extends at least partially along at least two of the top side edges thereof, and the skirt extends laterally to abut respective sidewalls thereof.

3. Ventilated litter box according to claim 2, wherein the the cover fits onto the rear and both opposite side top edges thereof.

4. Ventilating litter box according to claim 1, wherein the vent opening is formed in the cover by a cylindrical flange integral therewith.

5. Ventilating cover for litter box according to claim 1, rectangular with quadrilateral sidewalls, wherein the cover is U-shaped in plan, the body portion of the U fitting along one sidewall and the arm portions of the U fitting along both flanking sidewalls into proximity with the opposite sidewall.

6. Ventilating litter box apparatus according to claim 5, wherein the respective portions of the U-shaped cover extend away from the respective sidewalls only a minor portion of the corresponding dimension of the base portion, and the uncovered part of the base portion is larger in area than the covered part thereof.

* * * * *